US008805935B2

(12) United States Patent
Kirkland et al.

(10) Patent No.: US 8,805,935 B2
(45) Date of Patent: *Aug. 12, 2014

(54) INSTANT MESSAGING WINDOWING FOR TOPIC THREADS

(75) Inventors: Dustin C. Kirkland, Austin, TX (US);
Richard J. McCarty, Austin, TX (US);
Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1394 days.

This patent is subject to a terminal disclaimer.

(21) Appl. No.: 12/099,565

(22) Filed: Apr. 8, 2008

(65) Prior Publication Data

US 2008/0183832 A1 Jul. 31, 2008

Related U.S. Application Data

(63) Continuation of application No. 10/752,804, filed on Jan. 7, 2004, now Pat. No. 7,383,307.

(51) Int. Cl.
*G06F 15/16* (2006.01)
*G06F 3/00* (2006.01)

(52) U.S. Cl.
USPC ........... 709/206; 709/201; 709/204; 709/205; 709/207; 709/227; 715/700

(58) Field of Classification Search
USPC ................ 709/201, 203–207, 217, 249, 250
See application file for complete search history.

(56) References Cited

U.S. PATENT DOCUMENTS

| | | | |
|---|---|---|---|
| 5,617,541 A | 4/1997 | Albanese et al. | |
| 5,995,940 A | 11/1999 | Ramaley | |
| 6,212,548 B1 | 4/2001 | DeSimone et al. | |
| 6,301,609 B1 | 10/2001 | Aravamudan et al. | |
| 6,392,997 B1 * | 5/2002 | Chen ............................. | 370/252 |
| 6,430,602 B1 | 8/2002 | Kay et al. | |
| 6,430,604 B1 | 8/2002 | Ogle et al. | |
| 6,484,196 B1 | 11/2002 | Maurille | |
| 6,493,703 B1 | 12/2002 | Knight et al. | |
| 6,510,458 B1 | 1/2003 | Berstis et al. | |
| 6,557,027 B1 | 4/2003 | Cragun | |
| 6,594,693 B1 | 7/2003 | Borwankar | |

(Continued)

OTHER PUBLICATIONS

Office Action, dated Feb. 20, 2007, regarding U.S. Appl. No. 10/427,137, 8 pages.

(Continued)

*Primary Examiner* — Ranodhi Serrao
*Assistant Examiner* — Farrukh Hussain
(74) *Attorney, Agent, or Firm* — Yee & Associates, P.C.; Jeffrey S. LaBaw

(57) ABSTRACT

A method, apparatus, and computer instructions for managing multi-threaded conversations in an instant messaging system. The present invention provides a menu option to allow the start of a new topic of discussion within the current instant messaging session. When a new topic is selected, a new thread of conversation is created within the messaging window that is segregated from previous topics of discussion. This new thread of conversation may be created at all other locations for all of the parties involved in the instant messaging session. In this manner, each party to a messaging session containing multiple conversations may be able to understand which response is related to which thread of conversation. In addition, a menu option may be provided by the instant messaging application to allow a user to merge one or more of the threaded conversations into a single conversation.

24 Claims, 4 Drawing Sheets

(56) References Cited

U.S. PATENT DOCUMENTS

| | | |
|---|---|---|
| 6,778,941 B1 | 8/2004 | Worrell et al. |
| 6,816,578 B1 * | 11/2004 | Kredo et al. ............... 379/88.17 |
| 6,832,245 B1 | 12/2004 | Isaacs et al. |
| 6,961,720 B1 | 11/2005 | Nelken |
| 6,964,040 B2 | 11/2005 | Osborn |
| 6,981,223 B2 | 12/2005 | Becker et al. |
| 7,007,085 B1 | 2/2006 | Malik |
| 7,016,978 B2 | 3/2006 | Malik et al. |
| 7,039,677 B2 | 5/2006 | Fitzpatrick et al. |
| 7,099,855 B1 | 8/2006 | Nelken et al. |
| 7,121,003 B2 | 10/2006 | Yasumura et al. |
| 7,124,123 B1 | 10/2006 | Roskind et al. |
| 7,124,372 B2 | 10/2006 | Brin |
| 7,142,664 B2 | 11/2006 | Seligmann |
| 7,174,453 B2 | 2/2007 | Lu |
| 7,185,057 B2 | 2/2007 | Brown et al. |
| 7,200,634 B2 | 4/2007 | Mendiola et al. |
| 7,200,635 B2 | 4/2007 | Yashchin et al. |
| 7,257,618 B2 * | 8/2007 | Danker et al. ............... 709/206 |
| 7,284,207 B2 * | 10/2007 | Canfield et al. ............... 715/842 |
| 7,383,307 B2 | 6/2008 | Kirkland et al. |
| 7,412,491 B2 | 8/2008 | Gusler et al. |
| 7,475,110 B2 | 1/2009 | Kirkland et al. |
| 7,480,696 B2 | 1/2009 | Kirkland et al. |
| 7,693,951 B2 | 4/2010 | Gusler et al. |
| 7,725,538 B2 | 5/2010 | Kirkland et al. |
| 7,882,195 B2 | 2/2011 | Kirkland et al. |
| 8,140,981 B2 | 3/2012 | Gusler et al. |
| 2001/0003202 A1 | 6/2001 | Mache et al. |
| 2002/0007398 A1 | 1/2002 | Mendiola et al. |
| 2002/0082484 A1 | 6/2002 | Baba et al. |
| 2002/0083134 A1 | 6/2002 | Bauer, Jr. et al. |
| 2002/0087649 A1 | 7/2002 | Horvitz |
| 2003/0009495 A1 | 1/2003 | Adjaoute |
| 2003/0018726 A1 | 1/2003 | Low et al. |
| 2003/0023684 A1 | 1/2003 | Brown et al. |
| 2003/0045311 A1 | 3/2003 | Larikka et al. |
| 2003/0046421 A1 | 3/2003 | Horvitz et al. |
| 2003/0131055 A1 | 7/2003 | Yashchin et al. |
| 2003/0131064 A1 | 7/2003 | Bell, III et al. |
| 2004/0024822 A1 | 2/2004 | Werndorfer et al. |
| 2004/0039786 A1 | 2/2004 | Horvitz et al. |
| 2004/0078445 A1 * | 4/2004 | Malik ............... 709/206 |
| 2004/0143636 A1 | 7/2004 | Horvitz et al. |
| 2004/0158610 A1 | 8/2004 | Davis et al. |
| 2004/0181577 A1 | 9/2004 | Skurikhin et al. |
| 2005/0050143 A1 | 3/2005 | Gusler et al. |
| 2005/0108332 A1 | 5/2005 | Vaschillo et al. |
| 2005/0149620 A1 | 7/2005 | Kirkland et al. |
| 2005/0149621 A1 | 7/2005 | Kirkland et al. |
| 2005/0149622 A1 | 7/2005 | Kirkland et al. |
| 2005/0228864 A1 | 10/2005 | Robertson |
| 2006/0248150 A1 | 11/2006 | Chaar et al. |
| 2007/0005703 A1 | 1/2007 | Vesterinen |
| 2008/0250335 A1 | 10/2008 | Gusler et al. |
| 2008/0250336 A1 | 10/2008 | Gusler et al. |
| 2009/0083389 A1 | 3/2009 | Kirkland et al. |
| 2009/0100141 A1 | 4/2009 | Kirkland et al. |

OTHER PUBLICATIONS

Final Office Action, dated Jul. 16, 2007, regarding U.S. Appl. No. 10/427,137, 11 pages.

Notice of Allowance, dated Apr. 9, 2008, regarding U.S. Appl. No. 10/427,137, 13 pages.

Office Action, dated Aug. 5, 2011, regarding U.S. Application No. 12/140,619, 19 pages.

Notice of Allowance, dated Nov. 28, 2011, regarding U.S. Appl. No. 12/140,619, 5 pages.

Notice of Allowance, dated Oct. 21, 2009, regarding U.S. Appl. No. 12/144,373, 17 pages.

Notice of Allowance, dated Nov. 19, 2009, regarding U.S. Appl. No. 12/144,373, 7 pages.

Office Action, dated Aug. 9, 2007, regarding U.S. Appl. No. 10/752,917, 13 pages.

Final Office Action, dated Nov. 16, 2007, regarding U.S. Appl. No. 10/752,917, 18 pages.

Office Action, dated Apr. 24, 2008, regarding U.S. Appl. No. 10/752,917, 17 pages.

Notice of Allowance, dated Aug. 29, 2008, regarding U.S. Appl. No. 10/752,917, 5 pages.

Notice of Allowance, dated Jan. 12, 2010, regarding U.S. Appl. No. 12/328,663, 18 pages.

Office Action, dated Aug. 9, 2007, regarding U.S. Appl. No. 10/752,804, 17 pages.

Notice of Allowance, dated Feb. 6, 2008, regarding U.S. Appl. No. 10/752,804, 16 pages.

Office Action, dated Aug. 9, 2007, regarding U.S. Appl. No. 10/752,919, 18 pages.

Final Office Action, dated Nov. 15, 2007, regarding U.S. Appl. No. 10/752,919, 21 pages.

Office Action, dated Mar. 21, 2008, regarding U.S. Appl. No. 10/752,919, 20 pages.

Notice of Allowance, dated Sep. 15, 2008, regarding U.S. Appl. No. 10/752,919, 5 pages.

Notice of Allowance, dated Sep. 23, 2010, regarding U.S. Appl. No. 12/342,040, 13 pages

* cited by examiner

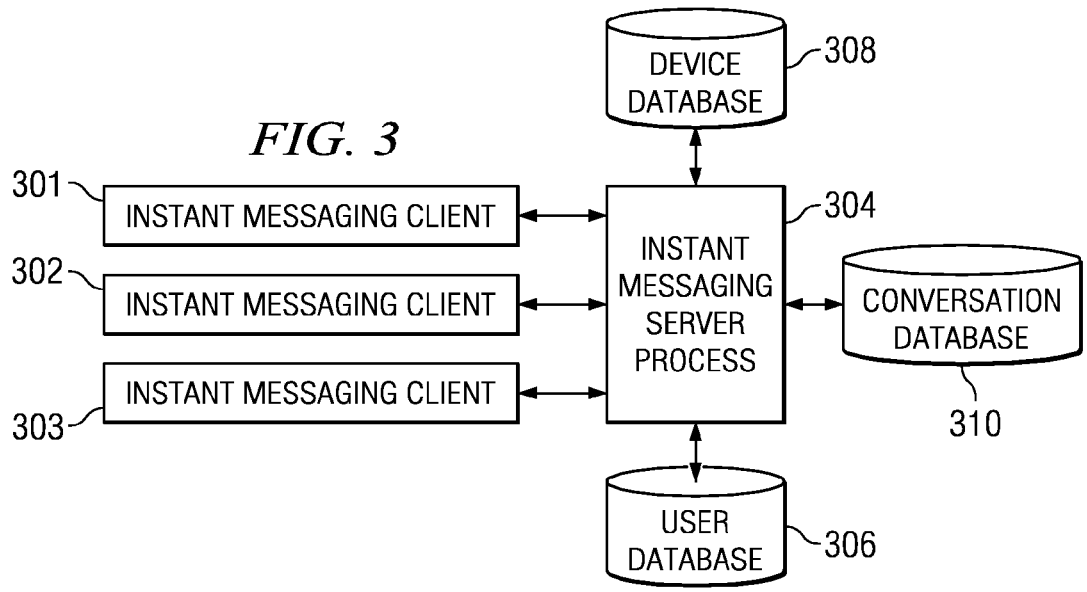
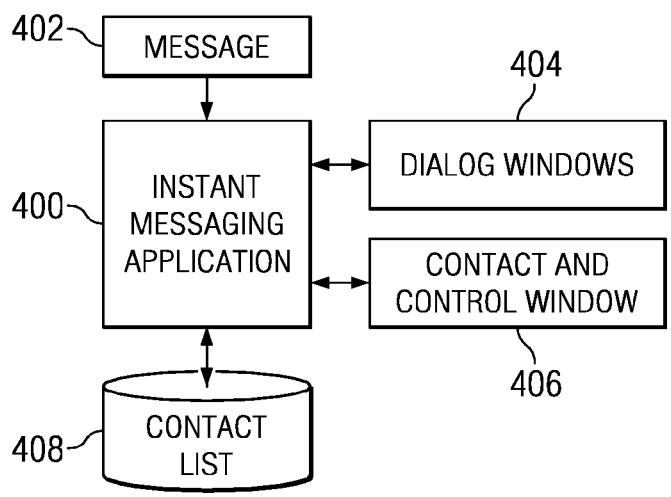

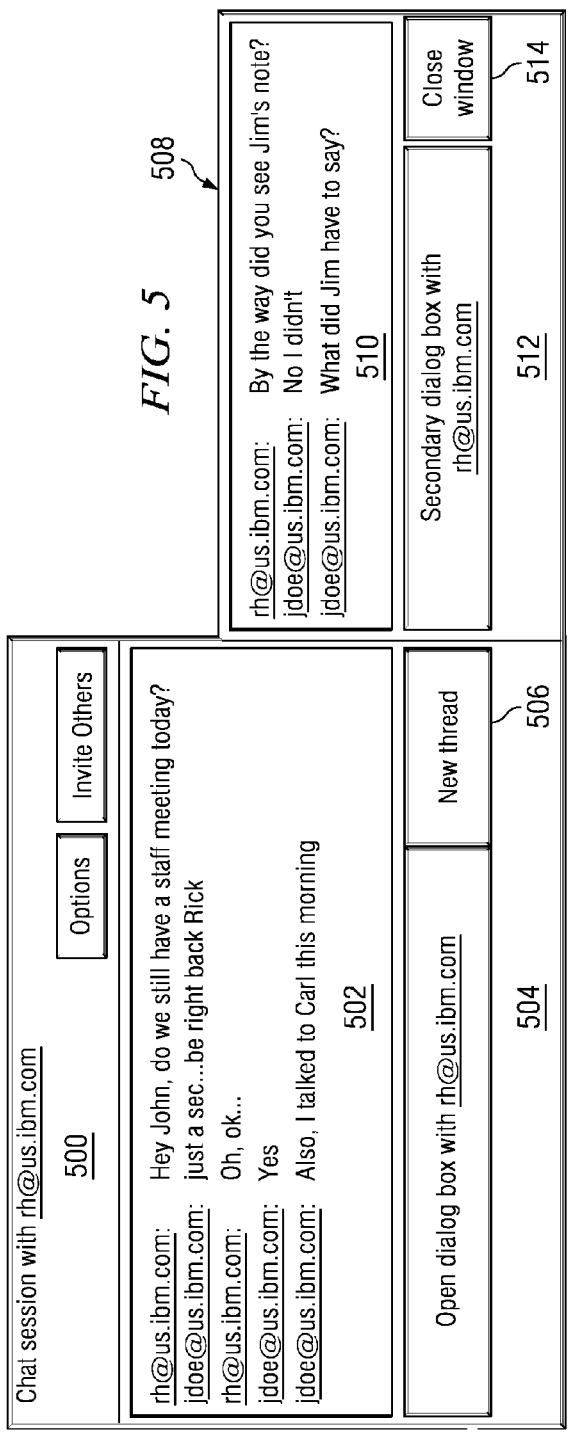

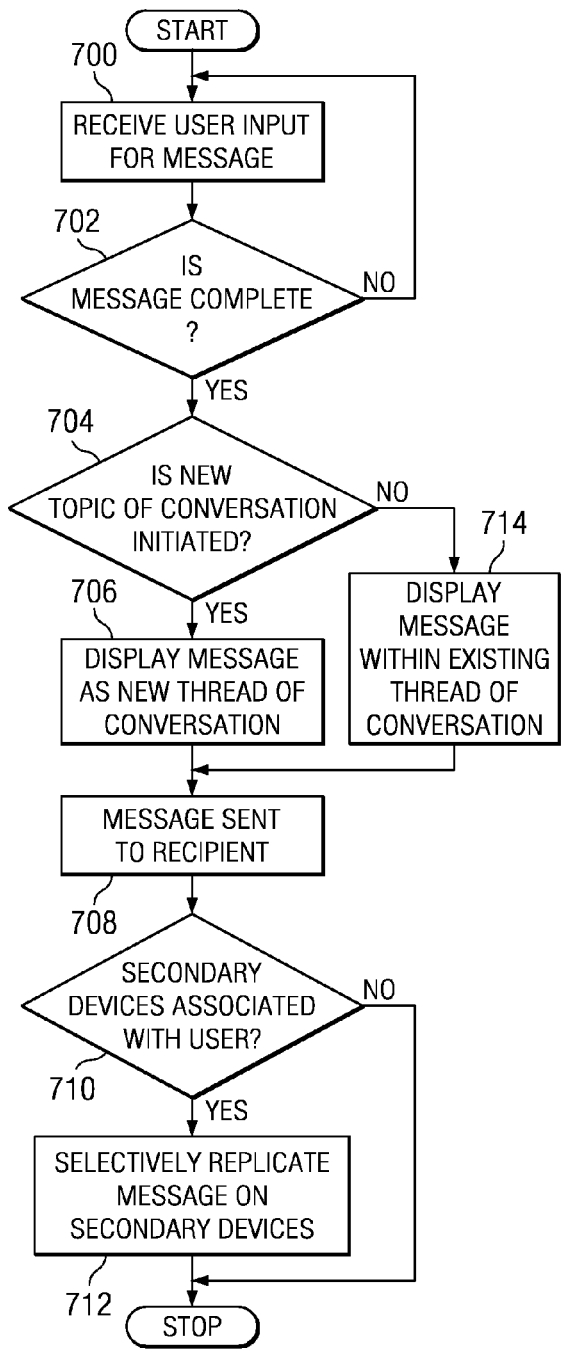
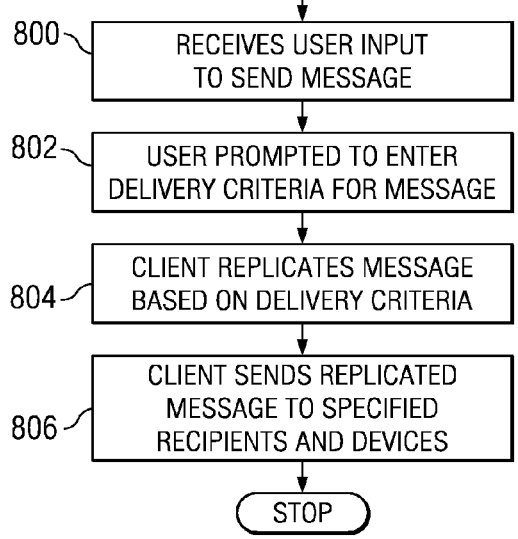
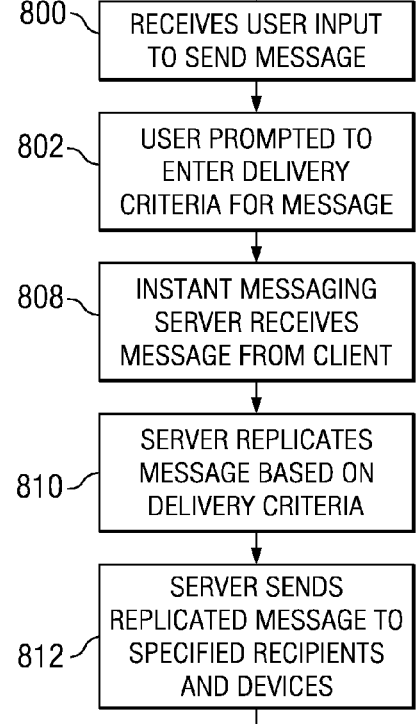

INSTANT MESSAGING WINDOWING FOR TOPIC THREADS

CROSS REFERENCE TO RELATED APPLICATIONS

This application is a continuation of application Ser. No. 10/752,804, filed Jan. 7, 2004, status pending. This application is related to applications entitled "Method and Apparatus for Enhancing Instant Messaging Systems", Ser. No. 10/427,137, filed on Apr. 10, 2003; "Method and Interface for Multi-Threaded Conversations in Instant Messaging", Ser. No. 10/752,917, filed on Jan. 7, 2004; "Instant Messaging Priority Filtering Based on Content and Hierarchical Schemes", Ser. No. 10/752,919, filed on Jan. 7, 2004. The above related applications are assigned to the same assignee, and incorporated herein by reference.

BACKGROUND OF THE INVENTION

1. Technical Field

The present invention relates generally to an improved data processing system for processing and displaying messages. In particular, the present invention provides a method, apparatus, and computer instructions for managing the delivery of multiple instant messaging sessions to multiple paired delivery points.

2. Description of Related Art

Instant messaging is an online chat medium, allowing users to communicate with each other and to collaborate in real-time over a network data processing system. Instant messaging is commonly used over the Internet. Instant messaging applications monitor and report the status of users that have established each other as online contacts. This information is typically presented to a user in a window. Instant messaging applications also are often used by users conducting business. By utilizing instant messaging, business users can view each other's availability and initiate a text conversation with colleagues or customers when a desired contact becomes available. Millions of users communicate using instant messaging systems every day. With instant messaging becoming an important part of both personal and business communications, functionality and usability enhancements are important to the continued success of this type of communication tool.

Instant messaging applications may be used in computing devices such as, for example, workstations, laptops, personal digital assistants (PDA), and digital or mobile phones. Larger devices, such as workstations and personal computers provide large amounts of storage and computing power. Smaller computing devices, such as a PDA or mobile phone, do not have as much processing power or storage. These types of devices, however, provide portability and convenience for the user.

Users may employ multiple computing devices to receive instant messages. For example, a user may conduct an instant messaging session with a remote party on a workstation. This instant messaging session may also be delivered to another computing device employed by the user, for example, the user's mobile phone. In this manner, a user may conduct an instant messaging session using multiple computing devices, each device being paired with the user's other available devices to receive and conduct an instant messaging session on each device.

However, a shortfall recognized by the present invention is an inability of a user receiving messages on multiple devices to determine which replies belong to which questions or comments when multiple communications threads are occurring. Currently, multiple conversation threads must be viewed and managed through a single window pane in legacy instant messaging systems. For example, a user may be utilizing an instant messaging session to talk to the user's manager about a particular contract and when the user remembers he needs to ask a completely unrelated question, the user is forced to insert this unrelated question into the current conversation thread in the window or wait until the current thread has completed. If, by waiting for the current thread to complete, the user may not remember the current topic. As a result, a user must attempt to understand what response is related to what thread of conversation. However, in some situations, it may not be possible to do so.

Therefore, it would be advantageous to have an improved method, apparatus, and computer instructions for managing the delivery of multiple instant messaging sessions having different threads of conversation to multiple paired delivery points.

SUMMARY OF THE INVENTION

The present invention provides a method, apparatus, and computer instructions for managing the delivery of multiple instant messaging sessions to multiple paired delivery points. In an existing instant messaging session, a user may initiate a new topic session using a first device. Within the existing instant messaging session on the first device, the new topic session may be replicated on secondary user devices associated with the first user. A user interface is provided on the first user device that is capable of distinguishing between data intended for the existing and new sessions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating components used in managing messages in accordance with a preferred embodiment of the present invention;

FIG. 4 is a block diagram illustrating an instant messaging client is depicted in accordance with a preferred embodiment of the present invention;

FIG. 5 is an exemplary messaging window for providing enhanced instant delivery messaging delivery management in accordance with the prior art;

FIG. 6 is a diagram illustrating an exemplary message headers comprising identification information in accordance with a preferred embodiment of the present invention;

FIG. 7 is a flowchart of a process for managing instant messages in accordance with a preferred embodiment of the present invention; and FIGS. 8A and 8B are flowcharts of the client and server processes for creating the multiple messages to be delivered in accordance with a preferred embodiment of the present invention.

DETAILED DESCRIPTION OF THE PREFERRED EMBODIMENT

As is known in the art, instant messaging is typically performed in distributed computing environments in which an instant messaging client application exists on at least two computing devices that communicate with one another by way of at least one network. Therefore, in order to provide a context in which the present invention may be implemented, the following description of a distributed computing environment is provided.

Figure 1:
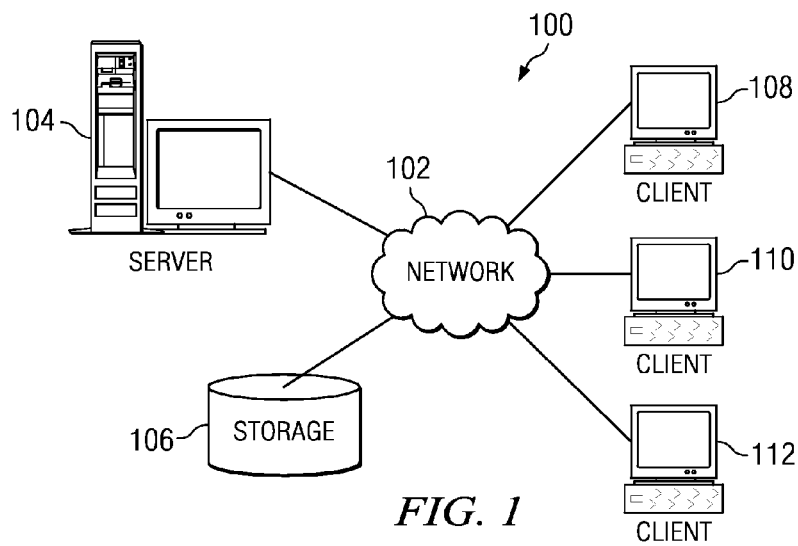
FIG. 1 depicts a representation of a network of data processing systems in which the present invention may be implemented.

With reference now to the figures, FIG. 1 depicts a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers or personal digital assistants (PDAs). In the depicted example, server 104 provides data, such as boot files, operating system images, and applications to clients 108-112. Clients 108, 110, and 112 are clients to server 104. Server 104 may act as an instant messaging server to facilitate the exchange of messages between users at clients, such as clients 108, 110, and 112. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
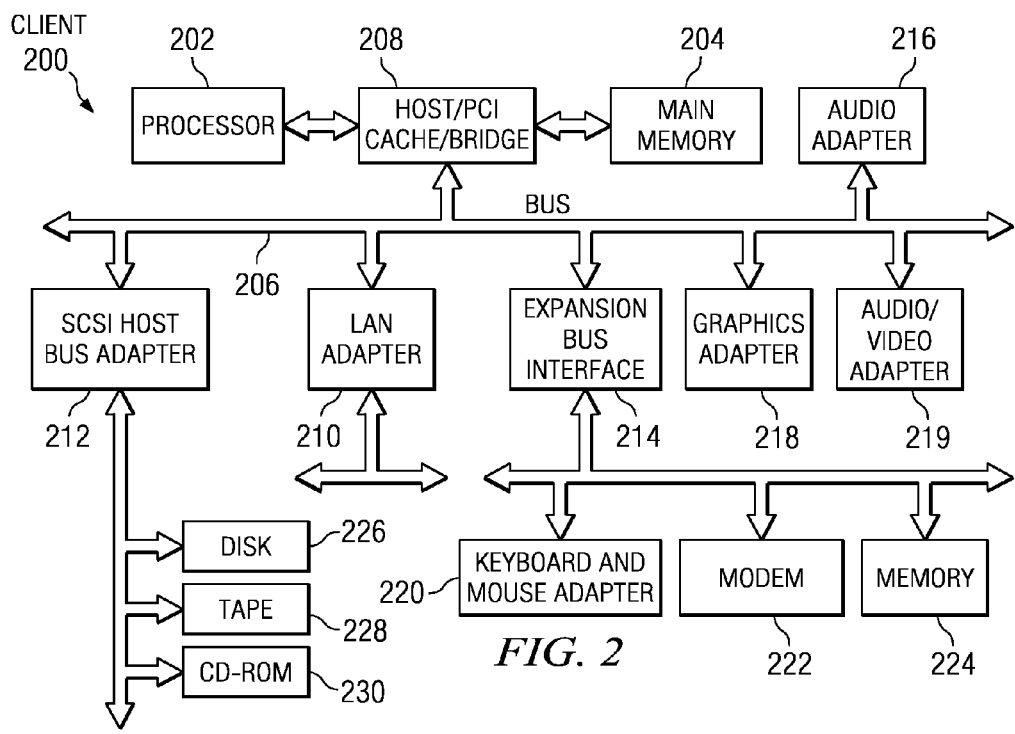
FIG. 2 is a block diagram illustrating a computing device in which the present invention may be implemented.

Referring to FIG. 2, a block diagram of a computing device that may be implemented as a client, such as clients 108, 110, and 112 in FIG. 1, is shown in which the present invention may be implemented. Computing device 200 is an example of a computer, such as a laptop computer or a workstation, in which code or instructions implementing the present invention may be located. Computing device 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. To contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within computing device 200 in FIG. 2. The operating system may be a commercially available operating system such as Windows XP, which is available from Microsoft Corporation. Instructions for the operating system and applications or programs are located on storage devices, such as hard disk drive 226, and may be loaded into main memory 204 for execution by processor 202.

Those of ordinary skill in the art will appreciate that the hardware depicted in FIG. 2 may vary depending upon the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, computing device 200, if optionally configured as a network computer, may not include SCSI host bus adapter 212, hard disk drive 226, tape drive 228, and CD-ROM 230. In that case, the computer, to be properly called a client computer, includes some kind of network communication interface, such as LAN adapter 210, modem 222, or the like. As another example, data processing system 200 may be a stand-alone system configured to be bootable without relying on some type of network communication interface, whether or not computing system 200 comprises some type of network communications interface.

The depicted example in FIG. 2 and above-described examples are not meant to imply architectural limitations. Computing system 200 also may include any type of computing device that is capable of running an instant messaging client application without departing from the spirit and scope of the present invention. Examples of such computing devices include, but is not limited to, personal digital assistants, laptop computers, network computers, wireless telephones, pager devices, and the like.

The present invention provides a method, apparatus, and computer instructions for managing the delivery of multiple instant messaging sessions to multiple paired delivery points. The present invention overcomes problems associated with existing delivery methods by providing a mechanism for configuring and managing an instant messaging framework that allows a user to conduct an instant messaging session with one or more users, using one or more devices, within one or more threads of conversation.

For example, a user may open an instant messaging session on a first device to establish a session with one or more other parties. The user may then use the first device to open a new topic messaging session on the first device, which is replicated on a second device by selecting a menu option on the first device. The user, using either the first or second device, communicates with the other messaging parties via the new topic messaging session. For example, a user may conduct a desktop to desktop messaging session concurrently with a mobile phone to mobile phone messaging session. In addition, if the other parties have paired instant messaging devices, the new messaging sessions will open on those corresponding paired devices as well. In contrast, if the other parties do not have paired instant messaging devices, a single instant messaging session is used for all messaging for those parties.

Turning now to FIG. 3, a block diagram illustrating components used in an instant messaging system in accordance with a preferred embodiment of the present invention is shown. In this illustrative example, a user at instant messaging client 301 may send or exchange messages with other users at instant messaging clients 302 and 303. These instant messaging clients may be executing on a computing system, such as computing system 200 in FIG. 2. The exchange of messages in these examples is facilitated through instant messaging server process 304. This process allows for users to find other users within the instant messaging system as well as aid in the exchange of messages between different users.

Depending on the particular instant messaging system, instant messaging server process 304 may only be involved in providing an indication of when particular users are online and for establishing initial contacts while users contacting users already on a buddy list may contact those users directly after seeing that a particular user is online. Instant messaging server process 304 may be located on a server, such as server 104 in FIG. 1.

Information regarding users registered to the instant messaging system may be stored in user database 306. User database 306 provides information needed to search for and find other users as well as contact users when they are online. Additionally, device database 308 is also present within this system. This device database stores device information associated with the registered users in user database 306. For example, a particular user may be associated with multiple devices, such as a desktop computer at the user's place of work, and a laptop computer and cell phone at the user's home. Each of these devices may be running, connected to a network, and receiving messages at any time. Furthermore, conversation database 310 stores information regarding the conversations conducted within the instant messaging session. For example, a messaging session may contain multiple conversation threads, such as a conversation regarding work, pleasure, etc.

As shown in FIG. 3, user database 306, device database 308, and conversation database 310 may be implemented as remote storage systems, such as storage 106 in FIG. 1. Alternatively, user database 306, device database 308, and conversation database 310 may be implemented as local storage devices, such as hard disk drive 226 in FIG. 2. Relationships may be established between a user in user database 306 and devices within device database 308 and stored within, such that a user registered within user database 306 is associated with particular devices listed in device database 308. These associations of devices to a particular user may be retrievable from the databases or from the relationships in the databases at the time a message is sent.

Similarly, relationships may be established between conversations in conversation database 310 and a particular user or device. For example, if a message is of a personal nature, this message may be directed toward the recipient's personal communication devices. Associations of devices of a particular user to a conversation thread may be retrievable from the databases or from the relationships in the databases at the time a message is sent.

Turning next to FIG. 4, a diagram illustrating an instant messaging client is depicted in accordance with a preferred embodiment of the present invention. The components illustrated in FIG. 4 may be found in an instant messaging client, such as instant messaging client 301, 302, or 303 in FIG. 3. These components may be implemented in a computing system, such as computing system 200 in FIG. 2.

In the illustrative example, instant messaging application 400 processes messages, such as message 402, received from users located on remote data processing systems. As messages are received, these messages are presented in dialog windows 404. Additionally, dialog windows 404 provide an interface for a user to input text to send messages to other users.

Contact and control window 406 is presented by instant messaging application 400 to provide the user with a list of user names, as well as other information. Contact and control window 406 also provides an interface to allow a user to set different preferences. For example, the user may set passwords required to access different names used in instant messaging sessions.

Also, a user may employ contact and control window 406 to set other preferences, such as colors and fonts used in instant messaging application 400. These preferences also may include whether a picture is to be sent when a session is initiated with another user. Depending on the implementation, the preference may be set to allow a user who receives messages to retrieve images of the senders from a remote database or a local cache.

Further, a list of names presented by contact and control window 406 are stored in contact list 408 in these examples. Additional user or screen names may be added to or deleted from contact list 408. This contact list is employed in presenting the list of names within contact and control window 406.

An instant messaging client may carry out replication of messages based on selected delivery options. Alternatively, the client may submit a message to an instant messaging server using wildcards which the server expands for multiple delivery. When a user conducts an instant messaging session on a computing device, the user selects the "send" button to send a message to a recipient. When the user selects the "send" button, the user may be prompted to specify several delivery options. For example, the user may specify to whom the message will be sent, be it one recipient, several recipients, or all recipients. Likewise, the user may specify which devices to send the message, be it one particular device, several devices, or all available devices. The user may also specify to which existing conversation thread or threads the message will belong, or whether the message is a new thread of conversation. In addition, a user may create default behaviors, such as assigning a default device (or list of devices) to which the messages should be delivered. These default behaviors may be manually overridden at any time. The user may then conduct messaging sessions, which were initiated on the first device, with other participants on the user's other devices. Existing messaging session topics are distinguishable from the new topic sessions through the interface of the computing device.

Turning next to FIG. 5, an exemplary messaging window for providing enhanced instant messaging delivery management is depicted in accordance with a preferred embodiment of the present invention. In this example, messaging window 500 is an example of a messaging window within dialog windows 404 in FIG. 4. Messaging window 500 is presented for purposes of illustration and not meant as a limitation as to how messages may be presented. Messaging window 500 is displayed when a message is received from another user.

Ongoing conversation pane 502 contains all messages for the current messaging session. Outgoing message pane 504 contains input from the user that is sent to other users at remote data processing systems. Outgoing message pane 504 is used to hold a current reply, but is emptied as soon as that reply is sent to the recipient. According to the present invention, a menu option such as new thread button 506 is included to allow for the delivery of multiple messaging sessions.

When a user starts a new topic of conversation in outgoing message pane 504, the user may send the message by selecting a menu option, such as new thread button 506. By selecting the new thread button, new window 508 is presented to the user. In this second window, a second discussion thread is presented in ongoing message pane 510 of window 508. The user input is entered into outgoing message pane 512. Outgoing message pane 512 is used to hold a current reply, but is emptied as soon as that reply is sent to the recipient. Secondary window 508 may be closed using closed window button 514.

Alternatively, a new topic of conversation may be initiated in messaging window 500 such that the new message is segregated from prior topics of conversation by initiating a new session on the user's device. In addition, the new session may be replicated on the user's other paired devices, such that the user may conduct messaging sessions with other participants on these secondary devices. The messaging sessions are initiated by sending a message to the device. Either the instant messaging client or instant messaging server may carry out replication of messages based on selected delivery options.

A session may be replicated and delivered to a user's other paired devices through the use of information contained in the message header. Although the present invention is presented using the style of the message header as described below, any message header style that conveys the necessary message information may be implemented without departing from the spirit and the scope of the invention.

In the preferred embodiment, delivery of instant messages is performed using three identification fields. The identification fields include a user ID, a device ID, and a conversation ID. These fields may be located in the message header to indicate how the message is to be delivered. As the identification fields are populated with the corresponding user, device, and conversation information for the particular instant message, this information is used in managing the delivery of the instant message.

For example, each participant in the distributed computing environment has a unique user ID ($USER_ID), such as rjones@us.ibm.com. Each device which is an endpoint on a network has its own unique device ID ($DEVICE_ID), such as 9.53.95.22. Each conversation thread taking place on a network between messaging participants is assigned its own unique conversation ID ($CONVERSATION_ID), such as 0ee9cb4279bc50854 (index to a database). The CONVERSATION_ID field may contain text describing the thread subject of the conversation or may contain an ID key that the client may index into a database of previously established thread subjects. Each message also has a body data, $DATA, which contains the message text. In this manner, the message header for an instant message may comprise of information in the following form:
$USER_ID:$DEVICE_ID:$CONVERSATION_ID:
$DATA In this manner, if a user wants to send a message to rjones@us.ibm.com on all devices to which RJones is connected, and within conversation ID 0ee9cb4279bc50854. The resulting message header may look like: $USER_ID=rjones@us.ibm.com,$DEVICE_ID=*, $CONVERSATION_ID=0ee9cb4279bc50854, $MESSAGE="How are you?", where "*" is a wildcard character. If RJones is connected to more than one device, a plurality of messages will be generated, one for each device to which RJones is connected. Message generation may occur either on the instant messaging client side (by referencing a local or remote database and performing a lookup for the addresses of all devices), or by allowing the instant messaging server to expand the "*" value in the $DEVICE_ID field by performing a similar lookup. As a result, multiple messages may be formed and delivered across combinations of users, devices, and conversations.

As is described above, the present invention employs a framework of identification fields to indicate delivery using a combination of user ID, device ID, and conversation ID. FIG. 6 illustrates exemplary message headers comprising identification information in accordance with a preferred embodiment of the present invention is shown. Each value in the header should have exactly one value for each of the delivery fields. If a field contains a wildcard character (*) or multiple references, these should actually be split into multiple messages to be delivered at some point before transmission.

In particular, as an instant messaging recipient may have multiple communication channels, the recipient may be identified using multiple user IDs. For instance, a recipient may have one or more work email addresses 602, one or more private email addresses 604, and a cell phone number 606. These communication channels are unique identifiers of ways to send the user a message, and may comprise $USER_ID 600.

As shown in FIG. 6, for example, $USER_ID 600 for recipient RJones may consist of work email address 602, private email address 604, and cell phone 608. A particular user may have several user IDs associated with the user. These associations may exist in a database and are retrievable at the time a message is sent. A participant may create a local address book that has multiple entries for a user. For example, if "Rjones" is in a user's contact list, the user may have several user IDs listed for him, such as
  BUSINESS_EMAIL=rjones@us.ibm.com
  PRIVATE_EMAIL=robertj@yahoo.com
  PHONE_EMAIL=512.555.1234@sprintpcs.com
Alternatively, these associations might be stored on an instant messaging server, having been gathered automatically, or registered manually by each user.

Likewise, as shown in FIG. 6, the message header may comprise identification information for the message sender. For example, $USER_ID_SEND 650 for sender LSmith may consist of work email address 652, private email address 654, and cell phone 656.
  BUSINESS_EMAIL=lsmith@us.ibm.com
  PRIVATE_EMAIL=leosmith@hotmail.com
  CELL_EMAIL=512.555.9876@sprintpcs.com
The message header may also comprise $DEVICE_ID_SEND 660 containing device identification information and $CONVERSATION_ID_SEND 670 containing conversation identification information for the message sender. These sender identification fields in the message header may be automatically populated with identification information of the user sending the message. In this manner, if the sender wants to receive responses back on multiple devices or on multiple user IDs (e.g., the sender is leaving work and heading home), the identification fields may contain a list of values from which delivery options may be obtained.

A user may send a message to all the devices concurrently or configure the delivery of the message to the identified communication channels into a chain, whereby the participant organizes the channels by priority. Thus, according to the configuration set by the sender, the message may be delivered to all of the identified channels in parallel at the same time. However, although delivering a message concurrently to all of the identified channels ensures the most rapid delivery, this approach consumes more resources and bandwidth. Alternatively, the message may be delivered to each channel in a priority sequence until a receipt notification is obtained.

A recipient may also have multiple device IDs 620. For example, a user may have desktop computer 622 at work, and laptop computer 624 and cell phone 626 at home. Each of these devices may be running, connected to a network, and receiving messages at any time. By providing a framework of multiple message delivery points, the present invention assists in increasing the delivery speed of messages to a user.

Furthermore, the recipient may override the delivery configurations set by the sender. For example, the sender may configure the delivery of a message containing personal content to be sent to a recipient's workplace computer. This delivery information will be placed in the header of the message. However, if the recipient does not wish to or is not allowed to receive personal communications at work, the recipient client may override the delivery configuration set by the message sender and switch the delivery of the message to another recipient device, such as the recipient's home computer. When the recipient client receives the message, the client software may employ an automatic forwarding agent to send the message to a device specified in the client profile. As a result, when the recipient receives the message at the workplace computer, the workplace computer's instant messaging system may send the message based on the recipient's home computer. This forwarding feature may be applied to all messages received or based on the thread content of the message.

Associations of device IDs to a particular recipient may be stored in a database and are retrievable at the time a message is sent. For example, recipient RJones receives instant messages at his user ID work address rjones@us.ibm.com. RJones is also connected to an instant messaging server with user ID rjones@us.ibm.com at several points, for instance, his office (machine jones1.austin.ibm.com 9.0.0.10), the lab (machine joneslab1.austin.ibm.com 9.1.0.50), and his wireless laptop (machine jones2.austin.ibm.com 9.2.3.4). If these are static IPs or machines that are registered in DNS, the list of machines to which RJones may potentially connect can be listed and associated with his user ID either on a remote server or on a local client. Sender LSmith wants to communicate with RJones, but he does not know which machine RJones is presently using. Thus, LSmith sends a first message comprising the following message header:
$USER_ID=rjones@us.ibm.com,$DEVICE_ID=*,
$CONVERSATION_ID=0ee9cb4279bc50854,
$USER_ID_SEND=lsmith@us.ibm.com,$DEVICE_ID_SEND=10.1.2.3,
$CONVERSATION_ID_SEND=0ee9cb4279bc50854,
$MESSAGE='Are you there?'
RJones responds from one of the machines, jones2.austin.ibm.com, and henceforth RJones is able to respond with the following message structure:
$USER_ID=lsmith@us.ibm.com,$DEVICE_ID=9.53.95.55,
$CONVERSATION_ID=0ee9cb4279bc50854,
$USER_ID_SEND=rjones@us.ibm.com,
$DEVICE_ID_SEND=jones2.austin.ibm.com,
$CONVERSATION_ID=0ee9cb4279bc50854,
$MESSAGE='Yes, do you have a question?'
In this manner, the first message sent out was a "feeler" to all of RJones' devices. Once RJones' location has been determined, subsequent messages are more specifically directed.

Participants in an instant messaging session may conduct multiple conversations as well. A message may contain multiple conversation threads, such as a conversation regarding work 642, pleasure 644, etc. Thus, $CONVERSATION_ID 640 may be used to identify multiple conversation threads in a message.

$USER_ID 600 may contain null, one, or more users. $DEVICE_ID 620 may contain null, one, or more devices. $CONVERSATION_ID 640 may contain null, one, or more conversation threads. A null value indicates a broadcast message that is limited in scope by the other identification fields. For example, $USER_ID 600, when null, may indicate all users meeting the rest of the identification criteria. $DEVICE_ID 620, when null, may indicate all devices meeting the rest of the identification criteria. $CONVERSATION_ID 640, when null, may indicate all conversations meeting the rest of the criteria, or a main thread of conversation. In this manner, the eight possible combinations of $USER_ID=1 or multiple, $DEVICE_ID=1 or multiple, and $CONVERSATION_ID-1 or multiple are listed below:

(1) Send a message to a particular user, on a particular device, within a particular line of conversation;
(2) Send a message to a particular user, on a particular device, within multiple lines of conversation;
(3) Send a message to a particular user, on multiple devices, within a particular line of conversation;
(4) Send a message to a particular user, on multiple devices, within multiple lines of conversation;
(5) Send a message to multiple users, on a particular device, within a particular line of conversation;
(6) Send a message to multiple users, on a particular device, within multiple lines of conversation;
(7) Send a message to multiple users, multiple devices, within a particular line of conversation;
(8) Send a message to multiple users, multiple devices, within multiple lines of conversation.

In the examples above, when a user selects a menu option to initiate a new session, a new session is opened on the user's device. If the user has other paired messaging devices, a parallel session may also be opened on these secondary devices, depending upon the information contained in the header. The user may then communicate with other messaging participants on the secondary devices. Likewise, if the participants have paired messaging devices, the parallel session will open on those paired messaging devices as well.

For the purposes of organization, messages intended for one particular thread of conversation are kept together. In addition, messages intended for a particular conversation may be automatically directed toward a particular user ID or device ID. For example, a message having a $CONVERSATION_ID value that indicates a personal conversation thread may be directed toward the recipient's personal communication channels or devices. In contrast, messages of high importance may be directed to more or all conversation threads. In this manner, a message regarding a work-related problem would be delivered into the "work" conversation queue, a message regarding a football game would be delivered into the "pleasure" conversation queue, and a message of high importance, such as a child with a broken arm at school, would interrupt all conversations.

If a participant in the instant messaging sessions does not have the capability of receiving instant messages on more than one device, a single instant messaging session on the single device is used to display all messaging for that participant. Thus, message content may be received for instant messaging sessions where some of the participants have the capability to receive multiple instant messaging sessions on multiple devices, and others do not.

Turning next to FIG. 7, a flowchart of the process for managing the delivery of multiple messaging sessions to multiple paired delivery end points is depicted in accordance with a preferred embodiment of the present invention. The process illustrated in FIG. 7 may be implemented in a distributed computing environment, such as network data processing system 100 in FIG. 1.

The process begins by receiving user input for a message on a first user device (step 700). Next, a determination is made as to whether the message is complete (step 702). If the message is not complete, the process returns to step 700. Otherwise, a determination is made as to whether the user has initiated a new topic of conversation (step 704). This determination may be made by checking if the user selected the new thread button on the messaging window. If a new topic of conversation has been identified, the message is displayed on the first user device as a different thread of conversation from the previous topic of conversation (step 706) and sent to the recipient (step 708). The message may be displayed in a new window or, if in the same window, displayed in a segregated manner from existing conversations. A determination is then made as to whether there are secondary devices associated with the user (step 710). If so, the message is also replicated on the user's secondary user devices (step 712). If there are no secondary devices associated with the user, the message is only displayed on the first user device, with the process terminating thereafter.

Turning back to step 704, if a new topic of conversation is not initiated, the message is identified and displayed as part of an existing conversation (step 714), and sent to the recipient (step 716).

Turning next to FIGS. 8A and 8B, flowcharts of the client and server processes for creating the multiple messages to be delivered is depicted in accordance with a preferred embodiment of the present invention. The processes illustrated in FIGS. 8A and 8B may be implemented in a distributed computing environment, such as network data processing system 100 in FIG. 1.

The processes begin by receiving user input to send a message on a first user device (step 800). Next, the user is prompted to enter delivery criteria for the message (step 802). The delivery criteria entered by the user indicates to which recipients and corresponding devices the messages will be sent. In one embodiment, based on the delivery criteria, the client may replicate the message for multiple delivery (step 804), and send the replicated message to the specified recipients and devices (step 806), with the process terminating thereafter. Alternatively, the instant messaging server may receive the message from the client (step 808), replicate the message for multiple delivery according to delivery criteria (step 810), and send the replicated message to the specified recipients and devices (step 812), with the process terminating thereafter.

Thus, the present invention provides an improved method, apparatus, and computer instructions for managing multiple instant messaging sessions to multiple message delivery points. The mechanism of the present invention provides a methodology for increasing the delivery speed of messages to the intended recipient by providing a framework for multiple message delivery points. A user may open an instant messaging session on a first device to establish a session with one or more other parties. The user may then use the first device to open a new topic messaging session on the first device, which is replicated on a second device by selecting a menu option on the first device. The user, using either the first or second device, communicates with the other messaging parties via the new topic messaging session. In addition, if the other parties have paired instant messaging devices, the new messaging sessions will open on those corresponding paired devices as well. In contrast, if the other parties do not have paired instant messaging devices, a single instant messaging session is used for all messaging for those parties. In this manner, an advantage is provided over existing delivery methods by providing a mechanism for configuring and managing an instant messaging framework that allows a user to conduct an instant messaging session with one or more users, using one or more devices, within one or more threads of conversation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for communication between a plurality of devices remotely connected via a network, comprising:

means for initiating a new topic session within an existing instant messaging session on a first user device associated with a first user in response to user input;

means for selectively causing the new topic session to be replicated on another user device associated with the first user within the existing instant messaging session on the first user device in response to user input on the first user device;

means for providing a user interface on the first user device which is capable of distinguishing between data intended for the existing and new sessions; and means for sending a message associated with the new topic session, wherein header information in the message indicates that the message is to be replicated on particular secondary user devices associated with the first user.

2. The data processing system of claim 1, wherein the first and another user devices include at least one of a desktop computer, a laptop computer, a cellular phone, a personal digital assistant, and a fax machine, and wherein the user interface distinguishes between the data using (i) device identifiers for the first and secondary user devices that are included with the data, and (ii) conversation identifiers for the existing and new sessions that are included with the data.

3. The data processing system of claim 1, wherein the user input is performed by selecting a button in a messaging window.

4. The data processing system of claim 1, further comprising:
   means for determining if a recipient has more than one device capable of receiving instant messages; and
   means for selectively sending a message to the recipient's devices.

5. The data processing system of claim 4, wherein the first user conducts the new topic session which was initiated on the first user device with the recipient using the another user device.

6. The data processing system of claim 4, wherein selectively sending a message to the recipient's devices is performed by sending the message to all of the recipient's devices.

7. The data processing system of claim 4, wherein selectively sending a message to the recipient's devices is performed by sending the message to the recipient's devices in a priority sequence until a receipt notification is obtained.

8. The data processing system of claim 1, wherein the user interface on the first user device distinguishes between data intended for the existing and new sessions by organizing the data in a topical manner, wherein a topic for the data is specified in a header received with the data.

9. The data processing system of claim 4, wherein header information in the message indicates that the message is to be replicated on particular recipient devices associated with the recipient, wherein the header information comprises an identifier of the first user, an identifier of the at least one secondary device associated with the first user, an identifier of the recipient and an identifier of the recipient's devices.

10. The data processing system of claim 9, wherein the first user updates the header information in the message.

11. The data processing system of claim 1, wherein at least one participant in the instant messaging session has a capability to display multiple threads of conversation in multiple devices, and at least another participant in the instant messaging session does not have the capability to display multiple threads of conversation in multiple devices.

12. The data processing system of claim 4, wherein the message is received at a recipient device and is selectively forwarded to another recipient device based on thread content of the message that is identified in header information in the message.

13. A non-transitory computer readable, recordable-type storage medium encoded with a computer program product and operable by a data processing system for facilitating communication between a plurality of devices remotely connected via a network, the computer program product comprising:
   first instructions for initiating a new topic session within an existing instant messaging session on a first user device associated with a first user in response to user input;
   second instructions for selectively causing the new topic session to be replicated on secondary user devices associated with the first user within the existing instant messaging session on the first user device in response to user input on the first user device;
   third instructions for providing a user interface on the first user device which is capable of distinguishing between data intended for the existing and new sessions; and
   fourth instructions for sending a message associated with the new topic session, wherein header information in the message indicates that the message is to be replicated on particular secondary user devices associated with the first user.

14. The computer program product of claim 13, wherein the first and secondary user devices include at least one of a desktop computer, a laptop computer, a cellular phone, a personal digital assistant, and a fax machine, and wherein the user interface distinguishes between the data using (i) device identifiers for the first and secondary user devices that are included with the data, and (ii) conversation identifiers for the existing and new sessions that are included with the data.

15. The computer program product of claim 13, wherein the user input is performed by selecting a button in a messaging window.

16. The computer program product of claim 13, further comprising:
   fourth instructions for determining if a recipient has more than one device capable of receiving instant messages; and
   fifth instructions for selectively sending a message to the recipient's devices.

17. The computer program product of claim 16, wherein the first user conducts the new topic session which was initiated on the first user device with the recipient using one of the secondary user devices.

18. The computer program product of claim 16, wherein selectively sending a message to the recipient's devices is performed by sending the message to all of the recipient's devices.

19. The computer program product of claim 16, wherein selectively sending a message to the recipient's devices is performed by sending the message to the recipient's devices in a priority sequence until a receipt notification is obtained.

20. The computer program product of claim 13, wherein the user interface on the first user device distinguishes between data intended for the existing and new sessions by organizing the data in a topical manner, wherein a topic for the data is specified in a header received with the data.

21. The computer program product of claim 16, wherein header information in the message indicates that the message is to be replicated on particular recipient devices associated with the recipient, wherein the header information comprises an identifier of the first user, an identifier of the secondary devices associated with the first user, an identifier of the recipient and an identifier of the recipient's devices.

22. The computer program product of claim 21, wherein the first user updates the header information in the message.

23. The computer program product of claim 13, wherein at least one participant in the instant messaging session has a capability to display multiple threads of conversation in multiple devices, and at least another participant in the instant messaging session does not have the capability to display multiple threads of conversation in multiple devices.

24. The computer program product of claim 16, wherein the message is received at a recipient device and is selectively forwarded to another recipient device based on thread content of the message that is identified in header information in the message.

* * * * *